Jan. 11, 1955   J. L. NAZZARO   2,699,162
KITCHEN RANGE SAFETY GUARD
Filed Jan. 9, 1950   2 Sheets-Sheet 1
Fig.1.
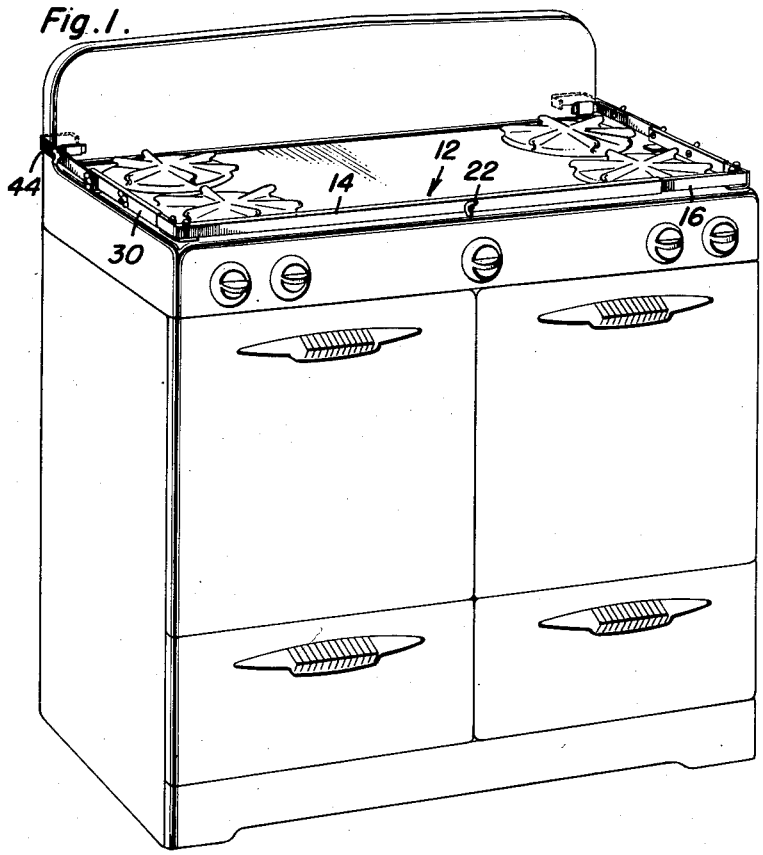
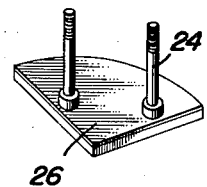
Fig.4.
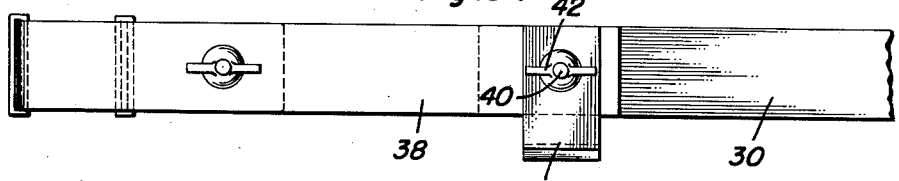
Fig.5.
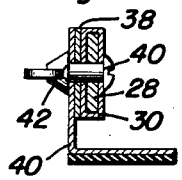
Fig.6.
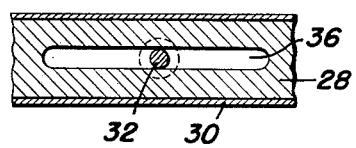
Fig.7.
Joseph L. Nazzaro
INVENTOR.
BY Clarence A. O'Brien
and Harvey B. Jacobson
Attorneys Jan. 11, 1955   J. L. NAZZARO   2,699,162
KITCHEN RANGE SAFETY GUARD
Filed Jan. 9, 1950   2 Sheets-Sheet 2
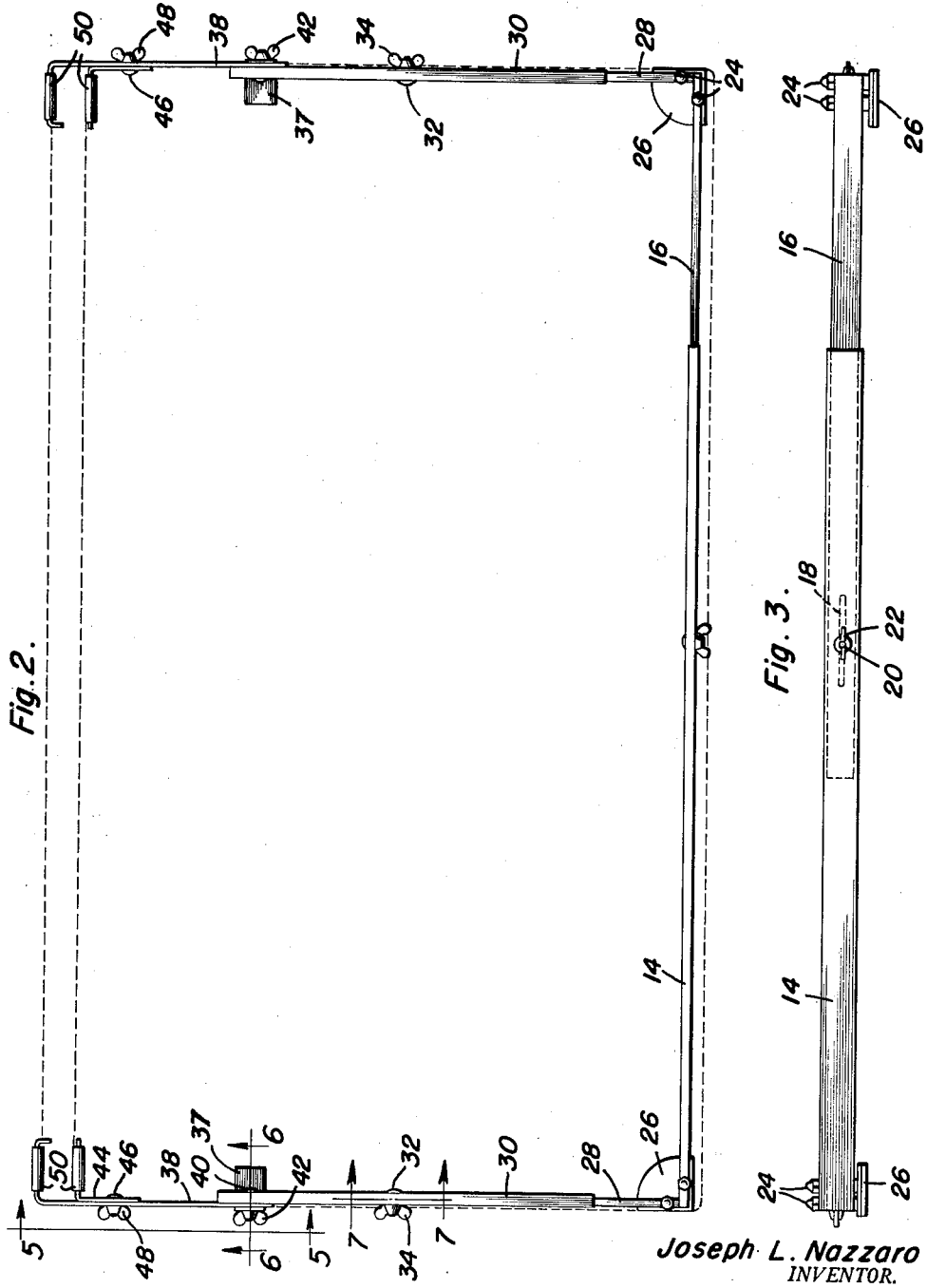
Joseph L. Nazzaro
INVENTOR.

United States Patent Office 2,699,162
Patented Jan. 11, 1955

2,699,162

KITCHEN RANGE SAFETY GUARD

Joseph L. Nazzaro, Jersey City, N. J., assignor of one-half to Vincent Nazzaro, Jersey City, N. J.

Application January 9, 1950, Serial No. 137,580

3 Claims. (Cl. 126—211)

This invention relates to the class of kitchen utensils, and more particularly to a novel guard for use on a kitchen range.

An object of this invention is to provide an easily adjustable and attachable guard for a kitchen range which will prevent pots and pans from sliding therefrom.

Another object of this invention is to provide means for rigidly securing a kitchen range safety guard to the back panel of a kitchen range, the front portions of these guards being readily rotatable upward from the kitchen range so that the kitchen range may be easily cleaned.

Still another object of the invention resides in the provision of a kitchen range safety guard that is readily adjustable so as to be easily secured on various sized kitchen ranges.

It is within the contemplation of this invention to employ this kitchen range safety guard on the stoves in the galley of a ship or the like so as to prevent the sliding of pots and pans when the ship is caused to roll or pitch by the elements.

Yet another object of the invention is to provide a kitchen range safety guard that may be easily folded for storage or for packaging for the sale thereof.

Still further objects of the invention reside in the provision of a kitchen range safety guard that is strong, durable, highly efficient in operation, simple in construction and manufacture, capable of being easily and cheaply manufactured, and quite pleasing in appearance.

These, together with the various ancillary objects of the invention which will become apparent as the following description proceeds, are attained by this kitchen range safety guard, a preferred embodiment of which has been illustrated in the accompanying drawings, by way of example only, wherein:

Figure 1 is a perspective view showing the invention in operative emplacement on a kitchen range;

Figure 2 is a top plan view of the kitchen range safety guard in a somewhat enlarged scale;

Figure 3 is a front elevational view of the kitchen range safety guard as shown in Figure 2;

Figure 4 is a perspective view of a connecting unit used to join the central member with the opposed pairs of parallel legs;

Figure 5 is a vertical sectional view as taken along line 5—5 in Figure 2;

Figure 6 is a vertical sectional view as taken along line 6—6 in Figure 2;

Figure 7 is another vertical sectional view as taken along line 7—7 in Figure 2.

With continuing reference to the accompanying drawings wherein like reference numerals designate similar parts throughout the various views, the numeral 10 generally designates a kitchen range on which the safety guard comprising the present invention is adapted to be emplaced. This kitchen range safety guard is generally indicated by reference numeral 12 and comprises a central connecting member comprising a pair of telescoping elements 14 and 16. The element 16 is provided with a longitudinal slot 18 medial the ends thereof through which a bolt 20 secured to the element 14 extends. A wing nut 22 is provided for rigidly securing the members 14 and 16 together in a predetermined relationship when the wing nut 22 is tightly screwed on the bolt 20.

The element 16 is slidable within the element 14, and both of these elements may be readily formed of channel or tubular cross sections.

The elements 14 and 16 are provided with apertures adjacent their outer ends for reception of one of a pair of bolts 24 which are welded or otherwise secured to connecting members 26. The other bolt of the pair of bolts 24 is secured in a similar aperture in the end of the first telescoping element 28 of a pair of parallel leg members. Slidingly connected with element 28 is a second element 30 by means of bolts 32 and wing nuts 34. As shown best in Figure 7, the element 28 is provided with a longitudinally extending slot 36 through which the bolts 32 extend.

Apertures are formed in the elements 30 for alignment with other apertures in the substantially L-shaped brackets 37 and in the portions adjacent the ends of substantially L-shaped members 38. Bolts 40 in cooperation with wing nuts 42 are used to selectively pivotally or rigidly connect the elements 30, brackets 37 and members 38 together. Slots, not shown, similar to the slots 18 and 36 are formed in the members 44. The other substantially L-shaped members 44 are secured in parallel extending relationship with the members 38. By means of bolts 46 and wing nuts 48 the members 44 and 38 are selectively held in a predetermined relationship. Each of the smaller legs of the L-shaped members 38 and 44 are provided with rubber guards 50 to prevent chipping or scratching of the surface of the back panel of the stove. Likewise, the bottom surfaces of the brackets 37 and connecting members 26 are provided with rubber sheeting as guards against marring the surface of the stove. In order to emplace this device on any kitchen range, it is merely necessary to adjust the elements 14 and 16 to the width of the stove. Then the leg elements 28 and 30 are adjusted relative to the stove. By means of the wing nut 48, the members 38 and 44 may be positioned in a clamp like arrangement about the back panel of the stove. When it is desired to clean the stove the wing nuts 42 can be loosened and the whole front portion of the guard can be rotated upwardly.

Since from the foregoing the construction and advantages of this kitchen range safety guard are readily apparent, further description is believed to be unnecessary.

However, since numerous modifications will readily occur to those skilled in the art after a consideration of the foregoing specification and accompanying drawings, it is not intended to limit the invention to the exact embodiment shown and described but all suitable modifications and equivalents may be resorted to which fall within the scope of the appended claims.

Having described the invention, what is claimed as new is:

1. A kitchen range safety guard of substantially U-shape having a pair of opposed substantially parallel legs, a central connecting member, said legs having attaching means at one pair of ends and having their other ends pivotally connected to said central connecting member, said central connecting member having telescoping means for adjustment to fit a selected kitchen range, said legs having telescoping means for adjustment to fit a selected kitchen range, said attaching means comprising a pair of clamps each including a first substantially L-shaped member having a pair of arms extending at right angles to each other, the longest of said pair of arms being pivotally connected to one of said legs, and a second substantially L-shaped member telescopingly connected to said first member.

2. A kitchen range safety guard of substantially U-shape consisting of a pair of extensible legs and an extensible central connecting member, means fixedly connecting said legs to said central connecting member, and attaching means pivotally connected to the free ends of said legs for attaching the guard to a kitchen range splash back, said attaching means comprising a pair of L-shaped members each having the free end of one arm pivotally secured to the free end of one of said legs, the other arm of each L-shaped member constituting a fixed jaw, a movable jaw mounted on said one arm cooperating with said fixed jaw for clampingly engaging a kitchen range splash back therebetween.

3. A kitchen range safety guard of substantially U-shape consisting of a pair of extensible legs and an extensible central connecting member, means fixedly connecting said legs to said central connecting member, and attaching means pivotally connected to the free ends of said legs for attaching the guard to a kitchen range splash back, said connecting means comprising plates having upstanding studs thereon, the adjacent ends of said central connecting member and legs having apertures through which said studs extend and fasteners securing said studs in said apertures, said plates constituting bearing feet for said guard, said attaching means comprising a pair of L-shaped members each having the free end of one arm pivotally secured to the free end of one of said legs, the other arm of each L-shaped member constituting a fixed jaw, a movable jaw mounted on said one arm cooperating with said fixed jaw for clampingly engaging a kitchen range splash back therebetween.

References Cited in the file of this patent

UNITED STATES PATENTS

| | | | |
|---|---|---|---|
| D. 129,740 | Chamberlain | | Sept. 30, 1941 |
| 921,869 | Munn | | May 18, 1909 |
| 1,042,973 | Rugaard | | Oct. 29, 1912 |
| 1,891,078 | Bernstein | | Dec. 13, 1932 |
| 2,197,167 | Wolf | | Apr. 16, 1940 |
| 2,231,381 | Boehmcke | | Feb. 11, 1941 |
| 2,379,206 | Westlake | | June 26, 1945 |
| 2,519,628 | Bothe | | Aug. 22, 1950 |

FOREIGN PATENTS

| | | |
|---|---|---|
| 1,096 | Great Britain | May 7, 1903 |
| 6,341 | Great Britain | Mar. 16, 1906 |
| 262,615 | Great Britain | Dec. 16, 1926 |
| 70,933 | Norway | Sept. 2, 1946 |